US011869733B2

(12) United States Patent
Manness et al.

(10) Patent No.: US 11,869,733 B2
(45) Date of Patent: Jan. 9, 2024

(54) BI-STABLE TRANSFER SWITCH

(71) Applicant: ALPHA TECHNOLOGIES LTD., Burnaby (CA)

(72) Inventors: Douglas Manness, Burnaby (CA); Robert Popove, Burnaby (CA); Daniel Wahlgren, Burnaby (CA)

(73) Assignee: ALPHA TECHNOLOGIES LTD., Burnaby (CA)

( * ) Notice: Subject to any disclaimer, the term of this patent is extended or adjusted under 35 U.S.C. 154(b) by 218 days.

(21) Appl. No.: 16/554,409

(22) Filed: Aug. 28, 2019

(65) Prior Publication Data

US 2021/0066000 A1 Mar. 4, 2021

(51) Int. Cl.
*H01H 3/30* (2006.01)
*H01H 3/58* (2006.01)
*H01H 9/20* (2006.01)

(52) U.S. Cl.
CPC ............ *H01H 3/3005* (2013.01); *H01H 3/58* (2013.01); *H01H 9/20* (2013.01); *H01H 2225/016* (2013.01); *H01H 2225/018* (2013.01)

(58) Field of Classification Search
CPC .......... H01H 3/3005; H01H 3/58; H01H 9/20; H01H 2225/018; H01H 2225/016; H01H 3/02; H01H 9/22; H01H 3/30
USPC ..................... 200/5 B, 5 C, 50.37, 1 B, 17 B
See application file for complete search history.

(56) References Cited

U.S. PATENT DOCUMENTS

| | | | | |
|---|---|---|---|---|
| 4,166,938 | A | 9/1979 | Peek | |
| 4,451,716 | A | 5/1984 | Lorenz | |
| 4,635,014 | A | 1/1987 | Erb et al. | |
| 4,709,126 | A | 11/1987 | Miller et al. | |
| 4,760,278 | A * | 7/1988 | Thomson | H01H 9/26 307/64 |
| 4,841,106 | A | 6/1989 | Jacquet et al. | |
| 5,081,367 | A | 1/1992 | Smith et al. | |
| 5,113,056 | A | 5/1992 | Kuhn | |
| 5,397,868 | A | 3/1995 | Smith et al. | |
| 5,944,172 | A | 8/1999 | Hannula | |
| 6,781,079 | B1 | 8/2004 | Hillegers | |
| 7,411,139 | B2 * | 8/2008 | McCoy | H01H 9/26 200/5 B |
| 7,834,282 | B2 * | 11/2010 | Flegel | H01H 9/26 200/50.32 |

FOREIGN PATENT DOCUMENTS

| | | | |
|---|---|---|---|
| CA | 1055995 | A | 6/1979 |
| CA | 2256791 | A1 | 7/1999 |
| CA | 2381237 | A1 | 2/2001 |
| CA | 2351111 | A1 | 12/2001 |
| CA | 2751698 | A1 | 8/2010 |
| CA | 2806128 | A1 | 1/2012 |

* cited by examiner

*Primary Examiner* — Lheiren Mae A Caroc
(74) *Attorney, Agent, or Firm* — Schacht Law Office, Inc.; Michael R. Schacht

(57) ABSTRACT

A power transfer switch suitable as a bypass switch connecting a utility feed to a load comprises a bi-stable actuator selectively driven by a compression means charged by a handle. A latch retains the actuator until suitable power source conditions are detected to allow the transfer to proceed. The controller releases the latch and the actuator abuts breakers in sequence to effect a reliable make-before-break or break-before-make transfer.

32 Claims, 13 Drawing Sheets

FIG. 10C
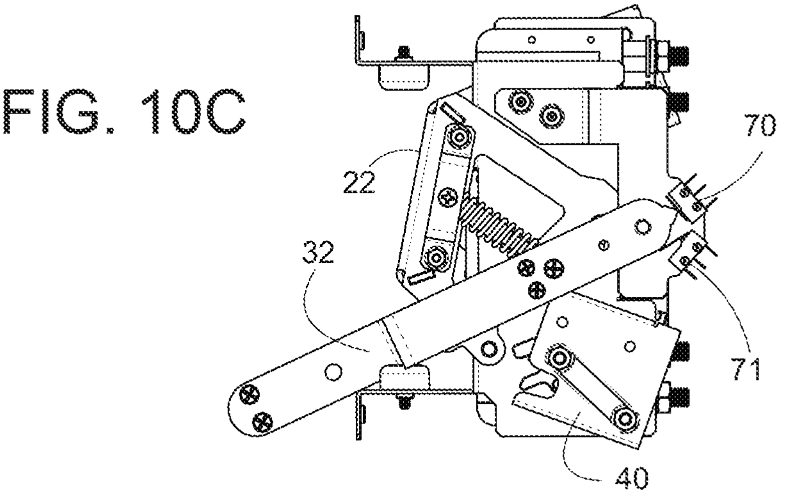
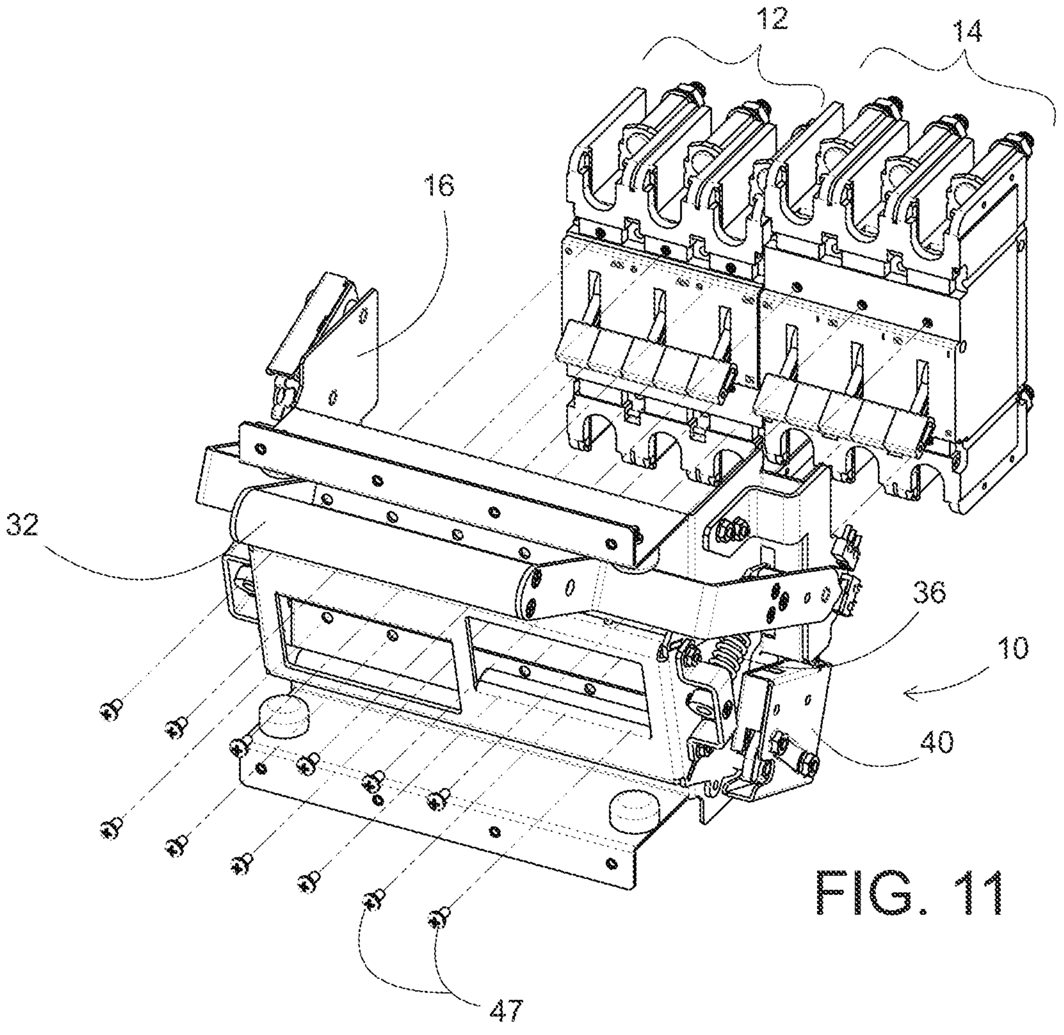
FIG. 11

BI-STABLE TRANSFER SWITCH

FIELD OF THE INVENTION

This invention relates to power transfer switches, and more particularly to bypass transfer switches used in power supply systems.

BACKGROUND OF THE INVENTION

Bypass transfer switches require high reliability, particularly in critical load applications. A number of considerations enter into play in switching between a UPS system and the main power source. Switching between the sources should be rapid, preferably within a quarter cycle. Switching should not occur if the destination source has no power. It should also be avoided if the two sources are not synchronized. Back-feed from the UPS to the utility should be avoided.

Manual transfer switches are sometimes supplied in an over-center toggle arrangement such that completion of the mechanical toggle is accelerated by a bias element that operates when a lever extends past a tipping point in its stroke. Canadian Patent Application No. 2,806,128, Canadian Patent No. 2,751,698 and U.S. Pat. No. 4,166,938 provide examples over-center toggle arrangements in transfer switches.

It is also known to use a mechanical coupling that maintains an open-closed relationship between breakers. U.S. Pat. No. 5,397,868 discloses a transfer switch that uses two pins to wedge a breaker handle, the pins moving along slots. There are separate pairs of pins for two spaced breakers. A handle actuates separate levers connected to the handle mechanism and the levers in turn actuate the pins). The mechanism ensures that there is never a time in which both breakers are closed.

U.S. Pat. No. 5,081,367 discloses a means of coordinating the opening and closing of breakers for a maintenance bypass system used in conjunction with a UPS that is not an over-center toggle system. The sequencing of the breaker operation is achieved by means of a lever arm that is attached to devices that actuate the breakers. The positioning of a pivot and the lengths of the lever arm operate to control the relative ON and OFF actions of the breakers. The system includes an interlock with an internal static switch to disable the manual bypass when the static switch has switched the load to the alternate power source. A lockout acts under control of a static transfer switch. It acts to lock out the maintenance bypass switch when the UPS is supplying the load. A push-button is available to override the lockout. At one point in the arc motion of a shaft a flange displaces a trigger which destabilizes a linkage to the abutment plate which then withdraws. That allows the charge spring to rapidly discharge thereby turning the crank shaft that trips the breakers. An electrical interlock switch acts to prevent operation of a magnetic actuator in the event that the manual handle is being rotated.

The use of some play between an actuating element and a link pin that indirectly actuates the breaker handle is illustrated in U.S. Pat. No. 5,944,172. An overtravel slot is actuated by an over-center toggle spring. No timing or sequence control between the breakers is provided by the system.

U.S. Pat. No. 5,113,056 discloses a stored-energy actuator for a single breaker. The spring that is loaded is a spiral spring and is not in an over-center arrangement. The spring is normally loaded by means of a piston-cylinder unit but the patent discusses the manual loading of the spring for maintenance purposes. Latches are mounted to prevent rotation of an actuation shaft. The latches are actuated by a magnet system but there is no discussion of control logic for the operation of the latches. The stored energy spring includes a latch mechanism to delay or control the operation of the breaker. There is no feature for coordinating the motion of separate breakers.

It is an object of this invention to provide a switch for transferring a load (or a set of loads) between sources such that the sequence and duration of connection overlap in a make-before-break system is predictably controlled.

It is a further object of the invention to provide a system which enables supervisory control of the switching between sources if the desired source is invalid or if any condition exists such that the sources should not be momentarily connected together.

It is a further object of the invention to sequence the transfer operation by signalling to one or more sources to change their output to be compatible with the others so that a transfer can occur, monitoring that the change has occurred, and then actuating the transfer.

It is a further object of the invention to provide a system capable of detecting failure of the currently connected source and automatically transfer to the alternate source if it is valid.

It is a further object of the invention to minimize the impact of operator error in operating the transfer handle as well as the training required.

These and other objects will be better understood by reference to this application as a whole. Not all of the objects are necessarily met by all embodiments of the invention described below or by the invention defined by each of the claims.

SUMMARY OF THE INVENTION

The invention is a bi-stable, charged energy-assisted, transfer switch for reliably controlling the sequence of throws and the relative states of at least a pair of breakers or switches.

The preferred embodiment of the invention is a handle-actuated, compression spring-assisted, bi-stable over-center toggle transfer switch for bypass breakers associated with, for example, a UPS.

Coordinated relative actuation of two circuit breakers is ensured by a mechanical linkage that is handle-actuated and which is used to control the relative positions or states, and the sequencing of the throws, of the breakers. Past the bi-stable fulcrum, the throw of the breakers is driven by the energy stored in the compression spring to reliably complete the change of state. As a result, once the actuation motion passes the bi-stable fulcrum, the completion of the change of state of the switch is predetermined and is not subject to a change in condition such as an operator tending to stop the switching motion in an intermediate position, or the failure of a power source that drives the switching motion.

A latching system selectively delays release of the charge on the bi-stable switch according to the source conditions so as to effectively control the operation of the switch.

In an embodiment, a mechanical linkage, herein preferably referred to as a “breaker trap” or “trap”, actuates the breakers in a continuous motion such that one breaker is turned ON before the other breaker is turned OFF, mechanically guaranteeing a momentary make-before-brake transfer. The mechanism prevents both breakers from being left on at the same time protecting against back-feed.

The breaker trap preferably comprises one or more openings through which utility and inverter breaker handles protrude. The breaker trap pivots causing the sides of the openings to push against and ultimately move all of the breaker handles as a result of a single motion of the trap. The configuration of the opening(s) can provide a make-before-break, or break-before-make operation.

By providing the breakers in an inverted relationship, the single trap motion operation ensures that both sources will not be left ON simultaneously.

The locations of the sides of the openings relative to one another can be selected to control the sequencing and delays between the toggling of the breaker handles. As the trap pivots between states, one of the sides may be made to contact a first breaker handle before another of the sides begins to contact the second breaker handle.

Energy for pivoting of the trap is stored by actuating an operator handle. If conditions are suitable this also initiates the transfer. A linkage connects the operator handle while a compression spring is attached to the operator handle in an over-center toggle arrangement. The compression spring is preferably attached to the operator handle at a point that is distal from the pivot of the handle. The throw of the handle extends across the opposite attachment point of the spring to the pivoting trap thereby providing an over-center action to the linkage. A pivoting latch mechanism prevents the trap from pivoting until the latch is released by engaging a locking pin on the trap. If the latch is locked, pivoting the handle acts to charge the spring while waiting for the latch to release.

The trap is pivoted at a point near but not coincident with the pivot axis of the handle. The compression spring includes a telescoping guide within the spring coils.

In an aspect, the invention is a transfer switch consisting of two independent switches mounted in a frame with a single mechanism that synchronously controls their operation. The mechanism comprises a handle, a bias assembly, and an abutment member. They are assembled as a mechanical linkage with a spring assembly connected between the handle and the abutment member such that the handle will load the bias assembly until it reaches the bi-stable position at which point the forces on the handle and abutment member will reverse direction. The bias assembly will then unload as the abutment member travels through the switching operation while the handle continues to complete its motion. During the switching operation the abutment member, by virtue of its geometry and the bias force, moves the switches (or the handles of each switch) in a synchronous manner such that the desired sequence and timing are achieved. The preferred sequence is make-before-break with a specified overlap time, however a break-before-make operation may also be achieved using different abutment member geometry.

The system is operable in unsynchronized, synchronized, automatic, controller or override modes.

In the unsynchronized mode, the latch releases to allow the transfer only if there is power on the destination source.

In a synchronized mode, in addition to verifying the destination source is valid, a phase detection and comparison circuit determines that the phases of the original and destination sources are sufficiently synchronized. If so it acts to trigger the release of the latch, allowing the compression spring to actuate the trap and therefore the transfer. In this mode the switch also requests phase synchronization of the controller which in turn controls the inverter to adjust the phase of its output. The phases may also be synchronized by using the internal bypass, or by allowing the inverter phase to drift (typically done be disconnecting the inverter input AC source) and opportunistically transferring when the phases align.

The switch will transfer to the source selected by the handle if the source is present and phase synchronized with the currently selected source.

In the automatic mode, the handle is charged for transfer but the latch releases only if the selected source is no worse than and is better than the currently connected source. Typically such mode is used when the transfer switch is in inverter mode, with the load connected to the output of the UPS or of the inverter, and the transfer switch will effect the transfer upon failure of the UPS.

In the controller mode, the operator handle is moved to charge the spring. The controller then controls the release mechanism under the control of the microcontroller although it still requires that the new source be present. This can enable remote operation of the switch and the selection of any suitable conditions for releasing the latch. The transfer switch will not initiate a transfer based on the phase angles. Instead it will monitor the microcontroller trap release request signal and actuate the trap based on it alone.

In over-ride mode the operator directly releases the mechanical latches using a push lever with restricted access.

In an embodiment, the invention is used with a UPS to switch the load between the inverter output and the mains. The invention can be implemented as an 18 kVA kAIC-rated make-before-break transfer switch and provides protection mechanisms to avoid the potential problems associated with rotary switches such as accidently switching to a failed source, incorrectly seating the switch in an intermediate position where sources are connected together, or switching between sources that are out of phase. In addition, the invention can be used to provide automatic transfer, remote transfer, and AC monitoring capabilities all of which increase the reliability and availability of the overall UPS system.

After a mode of operation is selected, a single handle is used to select between inverter and bypass paths. A user interface provides status and guidance to the operator.

The invention offers the opportunity of eliminating the separate internal bypass switch by monitoring for the correct conditions and allowing the external switch to actuate only when appropriate.

In a more generalized aspect, the invention is a power transfer switch for transferring a load from a connected source to a destination source, comprising an abutment member mounted to pivot in a direction of travel between two positions. The abutment member is configured such that during the pivoting motion, it applies force first to a first switch or breaker beginning at a first point in the abutment member's travel, and later to a second switch or breaker beginning at a second point in the abutment member's travel such that the travel between said two positions toggles the first and second switches or breakers non-simultaneously.

The power transfer switch may comprise a latch for selectively engaging the abutment member to restrain the abutment member from moving.

The power transfer switch may comprise a bias member selectively applying force on the abutment member urging it to pivot, which may be a compression spring. The power transfer switch may further comprise the aforementioned latch.

The abutment member may comprise a plurality of abutment surfaces, a first one being spaced from a second one along the direction of travel, the first and second abutment surfaces during the travel urging the first and second switches respectively to non-simultaneously toggle from a first toggle position to a second toggle position.

Third and fourth abutment surfaces, again spaced from one another in the direction of travel, may urge the first and second switches respectively to toggle non-simultaneously in the opposite direction, from the second toggle position to the first toggle position.

There may be both a first bias force member selectively applying force on the abutment member in the first mentioned direction and a second bias force member selectively applying force on the abutment member in an opposite direction and a latch for selectively engaging the abutment member to restrain it from moving.

The power transfer switch may further comprise a controller configured to implement a control protocol for selectively engaging or releasing the latch.

The abutment member may comprise two windows configured to allow breaker handles to protrude through the windows, wherein the first abutment surface is an edge of a first window and the second abutment surface is an edge of a second window.

The compression spring may be secured between a frame of the transfer switch and the abutment member in a bi-stable over-center toggle configuration. The abutment member and the compression spring may be configured such that when the abutment member travels past a fulcrum point the abutment member is driven by a bias force exerted by the compression spring to complete the travel of the abutment member.

There may be a pivoting handle used to charge the compression spring.

According to an embodiment, the power transfer switch switches between utility power on the one hand, and inverter output or an output of an uninterruptible power supply system on the other hand, the power transfer switch comprising a controller for selectively releasing the latch. The controller may be configured to receive instructions from a communication network. It preferably has inputs from a presently connected source and from a destination source.

In another aspect, the invention is a power transfer switch for transferring a load between a utility and a uninterruptible power supply, comprising a displaceable linkage for abutting a first breaker that selectively connects or disconnects the load from the utility and a second breaker that selectively connects or disconnects the load from the uninterruptible power supply, displacement of the linkage causing abutment of the linkage against the first and second breakers to toggle them between a connected state and a disconnected state. A compression spring is mounted in a bi-stable over center configuration between a handle and the linkage so as to exert a driving force on the linkage when the linkage is displaced past a fulcrum point. A handle is provided for compressing the compression spring. A releasable latch is configured to selectively restrain the linkage from displacement and a controller controls the release of the latch.

Toggling of the first and second breakers in a same direction respectively may open and close the first and second breakers.

The controller may be configured to release the latch only upon the detection of a predetermined state of the utility and the uninterruptible power supply.

The controller may also be configured to record power usage.

The controller may be configured to produce an alarm signal if a phase difference between the utility and an output of the uninterruptible power supply is below a predetermined threshold.

Position sensors may detect a position of the linkage and the controller may be configured to record the speed of switching as a function of inputs from the position sensors.

In another aspect, the invention is a method of controlling the operation of a power transfer switch, the power transfer switch comprising a bias member for urging a mechanical actuator to toggle a switch, a controller for selectively releasing a restraint that restrains the mechanical actuator from toggling the switch, the controller having inputs from an incumbent power source that is presently connected to a load and from a destination power source that would be connected to the load if the switch is toggled. The method comprises the step of releasing the restraint only upon the controller detecting the presence of a predetermined state of inputs based on the characteristics of the incumbent power source and the characteristics of the destination power source.

The incumbent and destination power sources may be AC power sources and the predetermined state of inputs may comprise predetermined states of each phase of the incumbent source and of each phase of the destination source.

The predetermined state of inputs may comprise power being present on the destination source. It may comprise each phase of the incumbent source being within a threshold difference of a corresponding phase of the destination source. The method may comprise the further step of the controller dispatching a phase synchronization to an uninterruptible power supply.

The controller may compare the states of each of corresponding phases of the incumbent and destination sources to determine whether a transfer of power would result in an overall better power source condition for the load.

The incumbent power source may be an inverter output and the destination power source may be a utility source, and the method may further comprise the step of positioning the bias member to exert a force biasing the actuator to toggle the switch to connect the load to the utility source; and the predetermined state may be a failure of the inverter source and the presence of power on the utility source.

There may be a further step of an operator operating a selector having a plurality of positions, each of said positions corresponding to a respective one of the predetermined states.

Preferably, the linkage, the compression spring, the handle, the latch and the controller are mounted within a frame of the power transfer switch to form an assembly and the assembly is connectable as a unit by fasteners to the first and second breakers.

The foregoing may cover only some of the aspects of the invention. Other and sometimes more particular aspects of the invention will be appreciated by reference to the following description of at least one preferred mode for carrying out the invention in terms of one or more examples. The following mode(s) for carrying out the invention are not a definition of the invention itself, but are only example(s) that embody the inventive features of the invention.

BRIEF DESCRIPTION OF THE DRAWINGS

At least one mode for carrying out the invention in terms of one or more examples will be described by reference to the drawings thereof in which:

FIGS. 10*a*, 10*b* and 10*c* are left side, front and right side views respectively of the switch with the trap having transitioned fully from the down to the up positions and resting in inverter mode;

FIG. 11 is a perspective view to illustrate the connection between the switch and the breakers;

DETAILED DESCRIPTION OF THE PREFERRED EMBODIMENT

Figure 1:
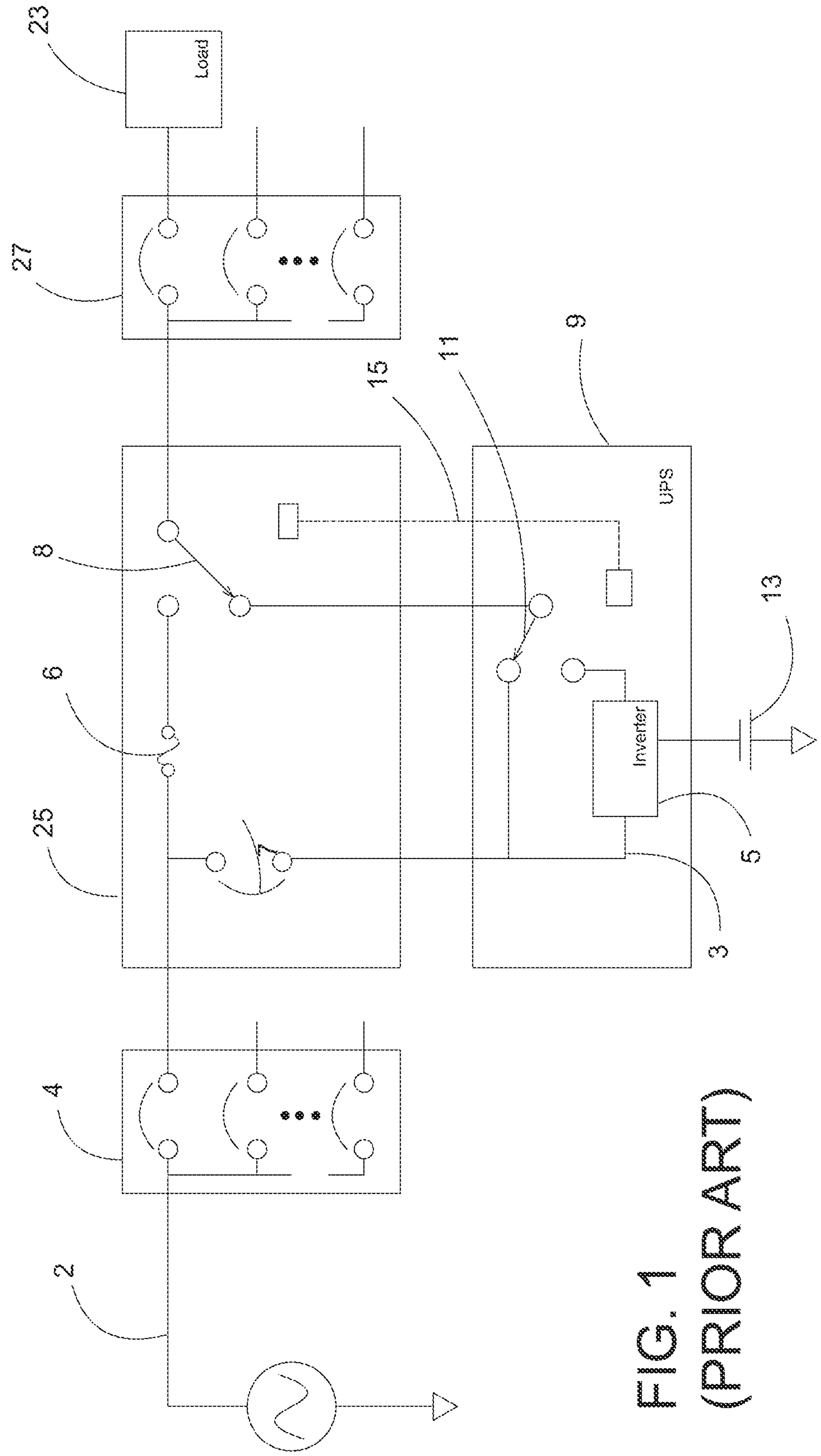
FIG. 1 (PRIOR ART)
FIG. 1 is a diagram showing the operation of a UPS, an internal bypass switch and an external bypass switch according to the prior art.

FIG. 1 shows a typical UPS installation using a traditional external bypass. The utility feed 2 is connected through a feed panel 4 and a fuse 6 to a rotary switch 8 that operates as an external bypass. The utility feed 2 is also connected to the input 3 of an inverter 5 through a breaker 7. Inside the UPS 9, the utility feed 2 also connects to another rotary switch 11 that acts as an internal bypass. The inverter 5 also receives DC power from an external battery 13. Since the internal bypass switch 11 is located inside the UPS 9 it is possible to coordinate synchronization of the inverter 5 to the utility and subsequent operation of the internal bypass, by directing the operator through messages on a UPS operating interface. Once the internal switch 11 is in bypass mode both inputs to the external bypass 8 are synchronized (they are both from the utility in this situation). The operator can then safely operate the external maintenance bypass switch 8. The external bypass switch 8 may include an interlock 15 with the internal bypass switch 11 to prevent incorrect sequencing of the external maintenance bypass switch 8. A traditional external maintenance bypass can also be implemented using breakers in which case they should be sequenced with mechanical locks. The load 23 may be connected to the external maintenance bypass 25 through a load panel 29.

Figure 2:
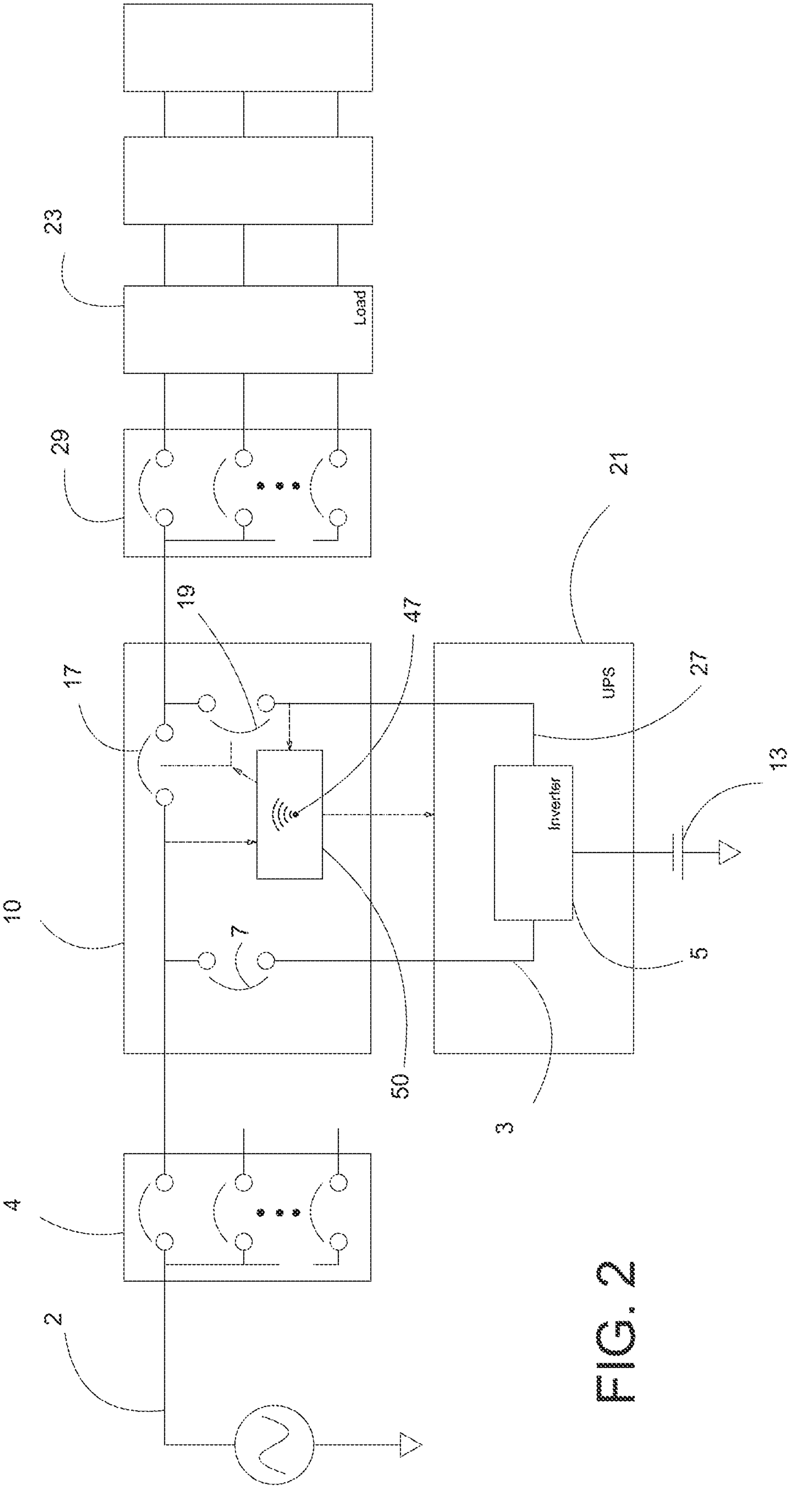
FIG. 2 is a diagram showing the UPS, a static bypass and the transfer switch of the preferred embodiment.
Figure 3:
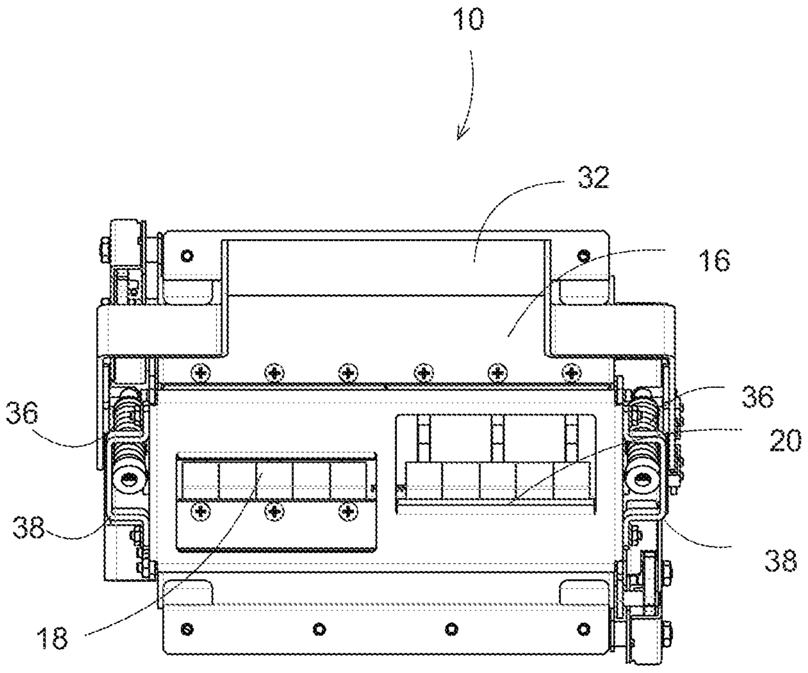
FIG. 3 is a front view of the preferred embodiment of the transfer switch according to the invention.
Figure 4:
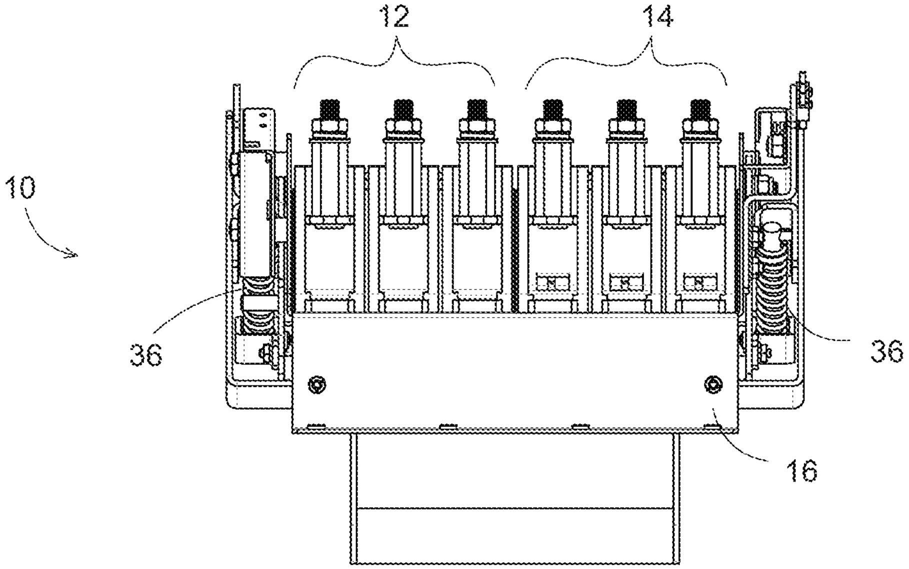
FIG. 4 is a top (plan) view thereof.
Figure 5:
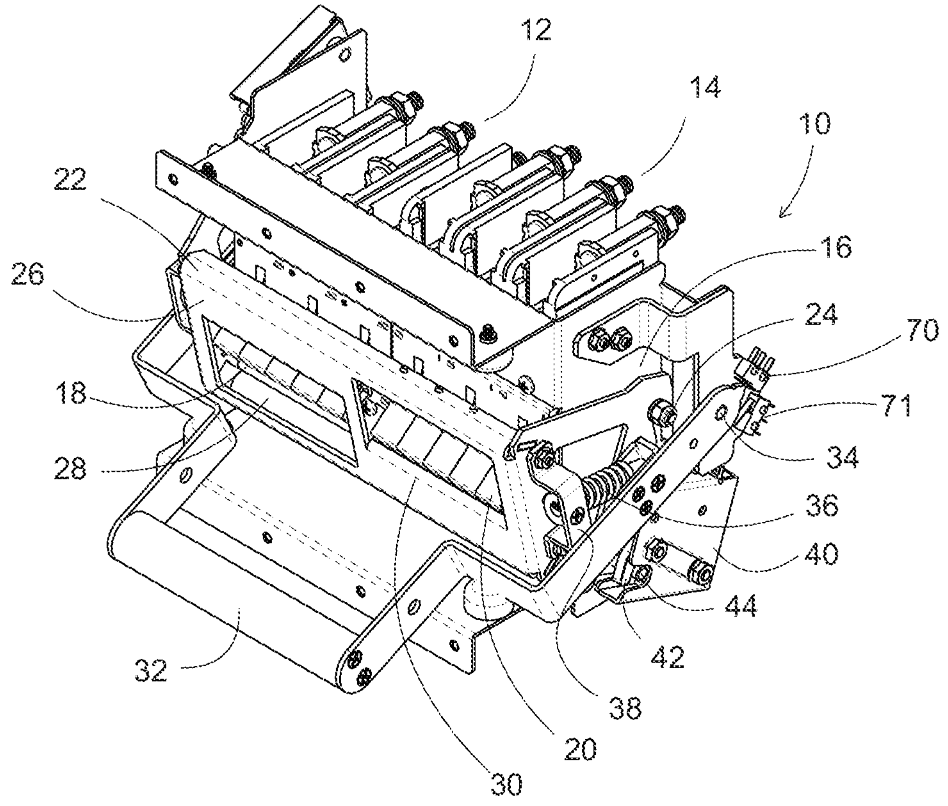
FIG. 5 is a perspective view thereof.
Figure 6:
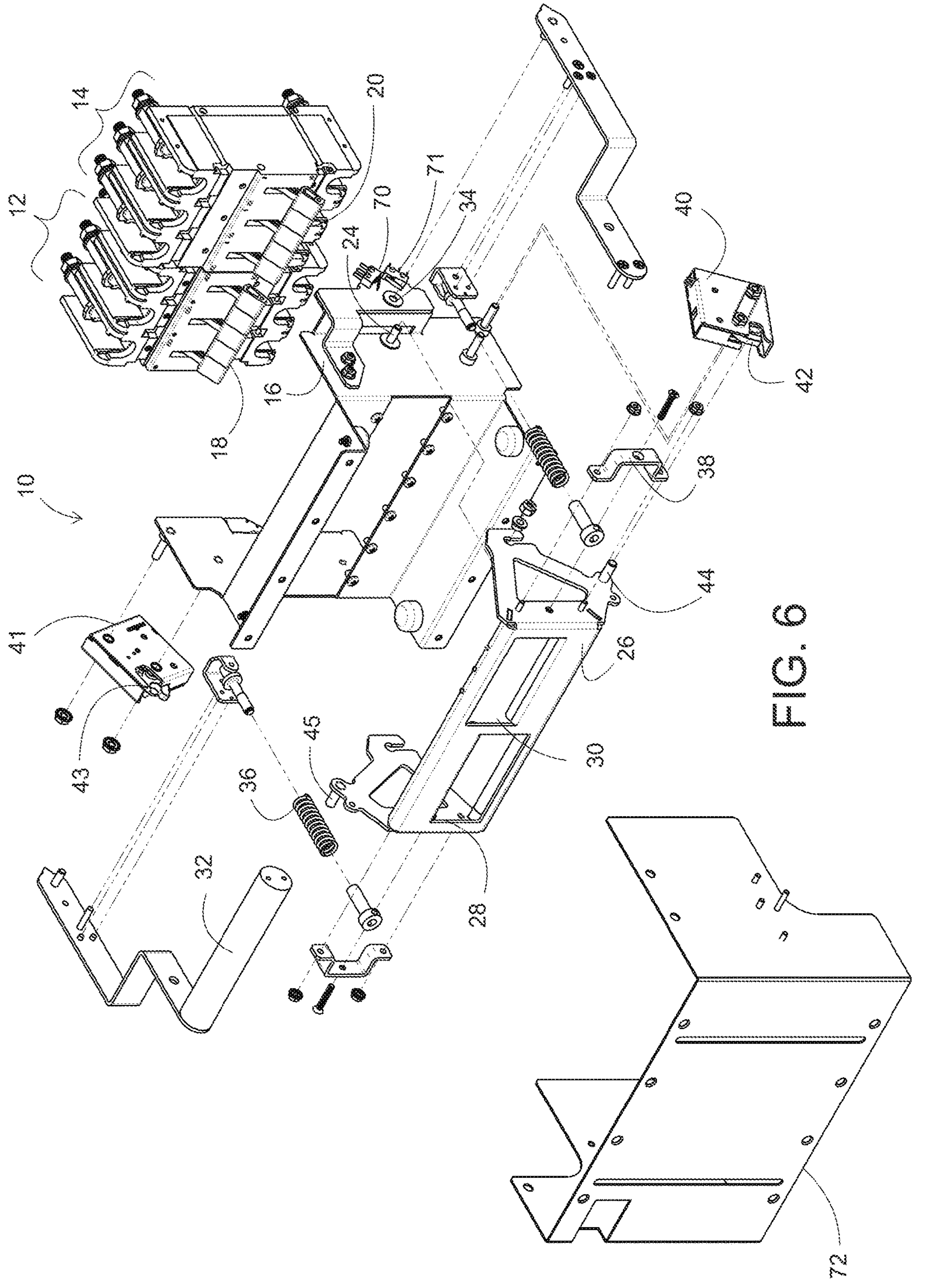
FIG. 6 is an exploded perspective view thereof.

FIG. 2 shows the bypass implementation using the proposed invention, including a power transfer switch 10 according to the preferred embodiment. Transfer switch 10 includes a controller 50. The transfer switch 10 is used to switch between the utility feed 2 (bypassing the UPS 21) and the inverter output 27 of the UPS 21. Although an internal bypass switch could be included in the UPS 21 it is not required and is not shown in this drawing. Otherwise the connections are the same as the traditional version, however the external bypass is now shown using breakers 17, 19.

Referring to FIGS. 3-6 showing the transfer switch 10, two three-phase breakers 12, 14 are mounted in a frame 16. The breakers may be commercially available toggle breakers. Frame 16 fits around breakers 12, 14, the breakers being mounted in reverse positions (one is upside down compared to the other) such that when the breaker handles 18, 20 of each breaker move in the same direction, one breaker is turned OFF/OPEN while the other is turned ON/CLOSED. For example, the utility power may be connected to the bottom terminal (not shown) on the rear of breaker 12 (when breaker 12 is upside down as shown) while the load is connected to the top terminal of breaker 12. The UPS inverter output is connected to the bottom terminal (not shown) on the rear of breaker 14 while the load is connected to the top terminal of breaker 14. When the breaker handles 18, 20 are both in the DOWN positions, only the utility power will be connected to the load and when they are both in the UP positions, only the inverter feed will be connected to the load.

A linkage or trap 22 preferably consists of a face 26 having two windows 28, 30. Trap 22 is pivotally connected to the frame 16 by a pivot pin 24 to pivot between two positions (e.g. UP and DOWN). Windows 28, 30 are located and dimensioned such that the breaker handles 18, 20 protrude sufficiently toward the windows 28, 30 that they come into contact with and abut abutment surfaces (namely edges) of the windows 28, 30 at least when the trap 22 is being pivoted across the front of the frame 16. The windows 28, 30 are vertically offset from one another to provide a short time delay and sequencing of the toggling of the breaker handles 18, 20 when the trap 22 migrates between its UP and Down positions. The latter feature avoids the loss of power to the load.

The linkage or trap 22 is in effect a mechanical actuator and an abutment member acting on the breakers to transfer power from an incumbent or presently connected source (the utility or the UPS or the inverter output) to a destination source (the UPS/inverter output or the utility).

Other physical arrangements can be contemplated other than the dual window arrangement of the preferred embodiment. For example, a single non-rectangular window might span the breaker handles 18, 20 with the window having vertically staggered abutment surfaces or edges (i.e. spaced in the direction of travel of the pivoting trap) that enter into contact with the respective breaker handles 18, 20 in sequence as the trap 22 migrates along its travel between its UP and DOWN positions across a first position in which one of the breakers is toggled and then a second position in which the other breaker is toggled. The breakers are thereby toggled non-simultaneously enabling by appropriate design of the trap a reliable make-before-break or break-before-make transfer. When pivoting in the opposite direction, facing spaced abutment surfaces act to toggle the breakers in the opposite direction, the relative spacing of the abutment surfaces again acting to ensure the non-simultaneous toggling of the breakers.

Other mechanical linkage arrangements may be used, provided that a single mechanical actuation operates to toggle the breakers (or the breaker handles) in a predetermined sequence. The contacting surfaces may be made resilient or yieldable to reduce striking forces or reduce tolerance requirements.

Movement of the trap 22 is actuated by a handle 32. Handle 32 is pivoted about a pivot mount 34. The trap 22 and the handle 32 could be mounted to the same pivot axis. However the inventors have found that having the handle pivot 34 further back than the trap pivot 24 reduces the spring over-load during operation.

Compression springs 36 are provided on each side of the handle 32. One end of each compression spring extends into a bracket 38 on the trap 22 while the opposite ends are rotatable about trap pivot 24 that is distal from the handle pivot. The compression springs include rigid guides 46 within the spring coils. Compression springs 36 are in compression in all positions of the trap 22 in an over-center toggle arrangement. The throw of the handle 32 extends across the opposite attachment points 38 of the springs 36 to the pivoting trap thereby providing an over-center action. The springs 36 provide a biasing force urging the trap 22 toward pivoting in the direction of pivot travel.

Pivoting latches 40, 41 include notches 42, 43 that engage respective locking pins 44, 45 on the trap 22 to restrain and prevent the trap 22 from pivoting away from the latches until the latches are released from their respective locking pins. If either of the latches is locked, pivoting the handle 32 acts to charge the springs 36 while waiting for the latches to release, but the trap 22 cannot move. Latch 40 operates to selectively hold the trap 22 in the DOWN position with the breakers in bypass/utility feed mode in the preferred embodiment, while latch 41 on the opposite side of the trap operates to hold the trap 22 in the UP position with the breakers in inverter mode in the preferred embodiment.

Figure 13:
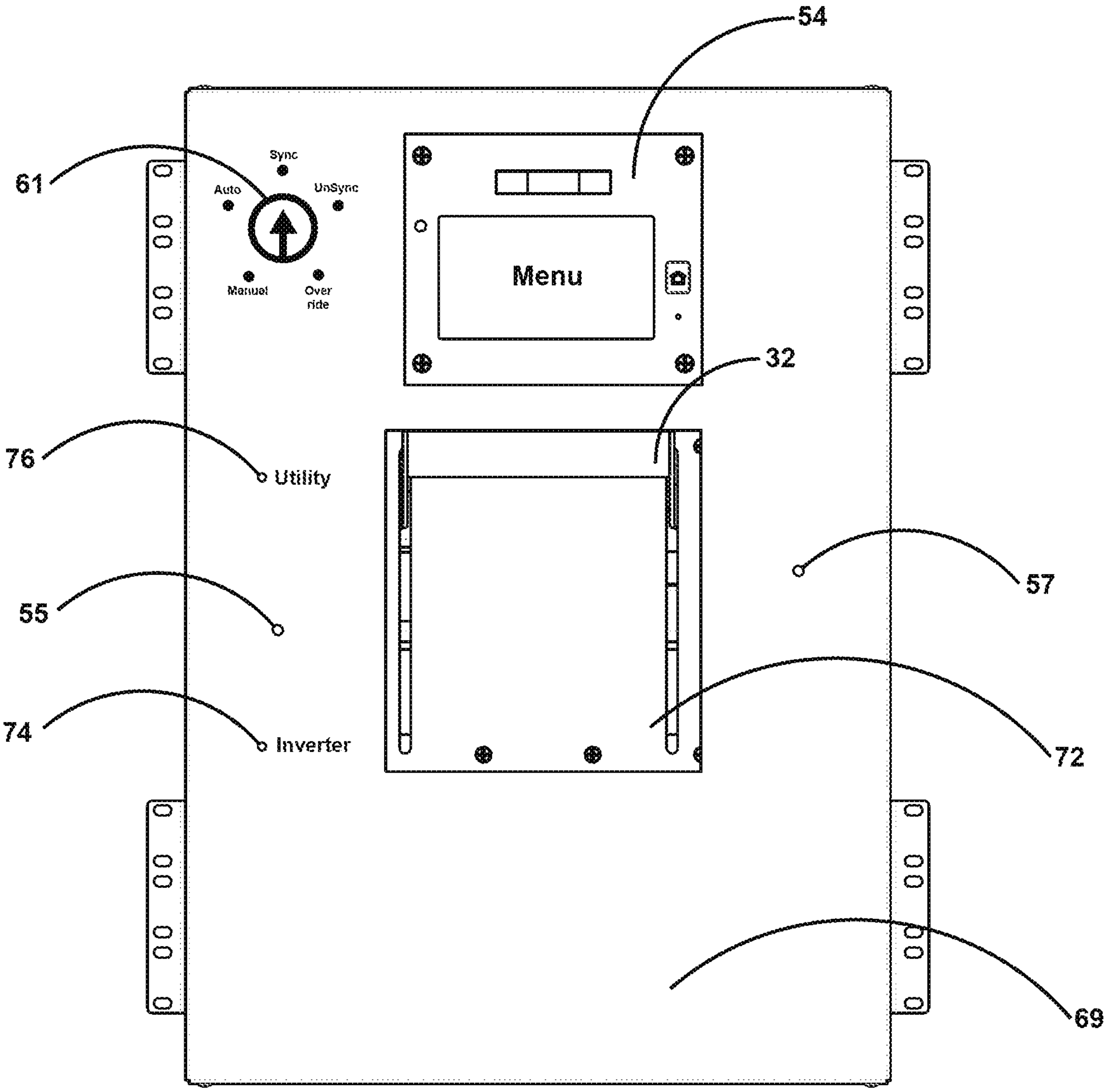

Controller 50 operates to control latches 40, 41 as a function of inputs from voltage sensors associated with the two sources (the presently connected source and the destination source) and according to a mode selection (described in more detail below) made by an operator by means of a selector switch 61 and suitable control programming. The selector switch 61 has a plurality of positions corresponding to different modes or control protocols for the power transfer switch. A user interface 54 (see FIG. 13) on the user panel 69 allows an operator to monitor and interact with the programming features of the transfer switch 10. Controller 50 is also enabled for remote communication (e.g. wireless 47 to connect to a communications network) so as to be able to receive control instructions or to deliver status or metering information.

The movement of the trap 22 and the effect of the compression springs 36 will now be described.

Figure 7A:
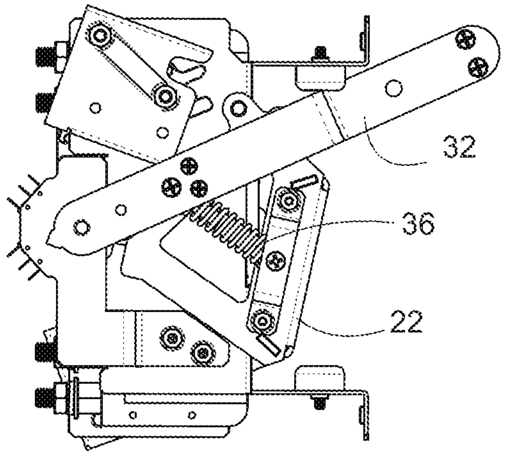
FIGS. 7*a* and 7*b* are left side and front views respectively of the switch in the bypass mode.
Figure 7B:
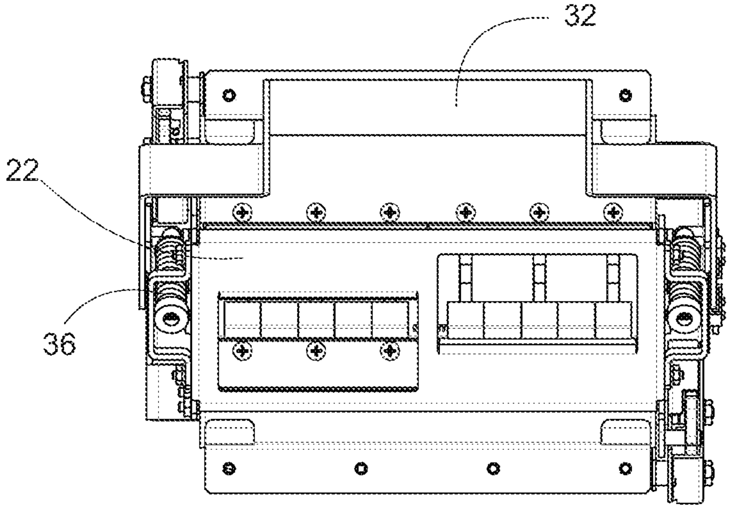

FIGS. 7*a* to 10*c* show the operation of the transfer mechanism. FIGS. 7*a* and 7*b* show the handle 32 in its up position and the trap 22 in the down position, which means that the compression springs 36 are de-energized with the utility breaker 12 ON and the inverter breaker 14 OFF. The switch 10 is in bypass mode. Compression springs 36 are connected at one end to the handle and at the other end to the trap. The location of the connection on the trap and the handle is such that the springs are compressed/energized when the trap and the handle are both in the down position or both in the up position. The compression spring is preferably attached to the operator handle at a point that is distal from the pivot of the handle. The throw of the handle extends across the opposite attachment point of the spring to the pivoting trap thereby providing an over-center action to the linkage.

Figure 8A:
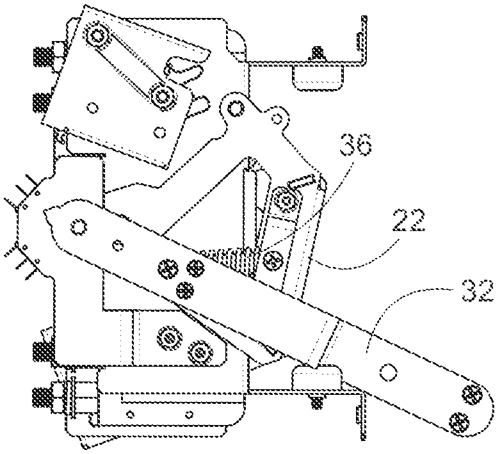
FIGS. 8*a*, 8*b* and 8*c* are left side, front and right views respectively of the switch with the spring charged but the latch engaged in bypass mode.
Figure 8B:
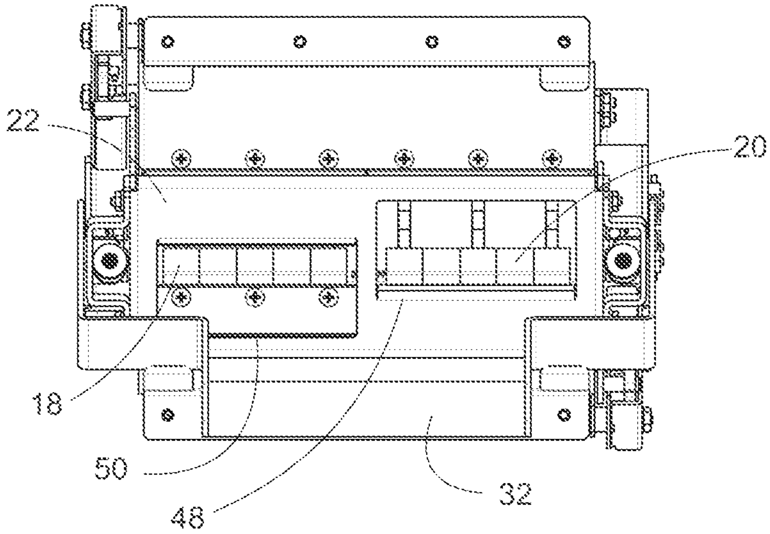
Figure 8C:
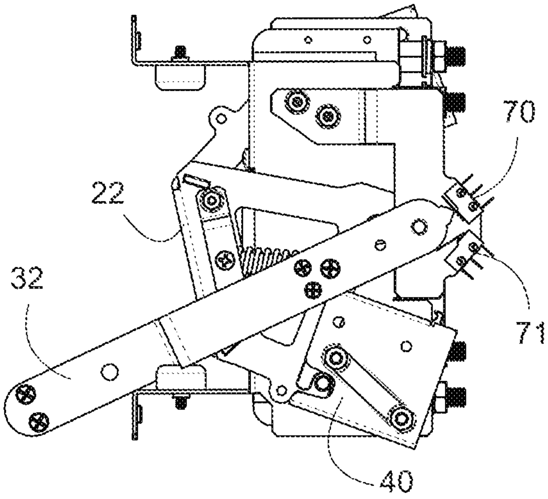

In FIGS. 8*a*, 8*b* and 8*c*, the handle 32 has been moved down thereby charging or energizing the springs 36 but the trap 22 is held in the down position by the latch 40 so that the switch 10 remains in bypass mode.

Figure 9A:
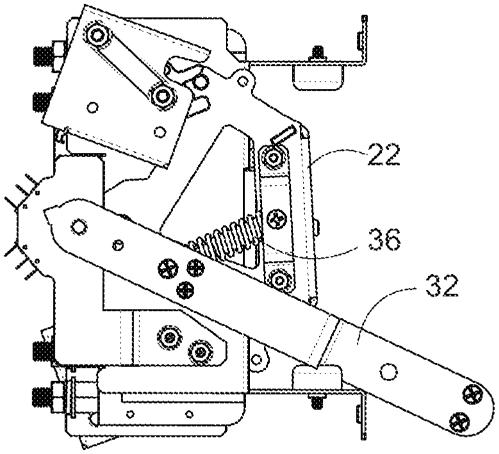
FIGS. 9*a*, 9*b* and 9*c* are left side, front and right side views respectively of the switch with the latch released and the trap transitioning from the down to the up positions.
Figure 9B:
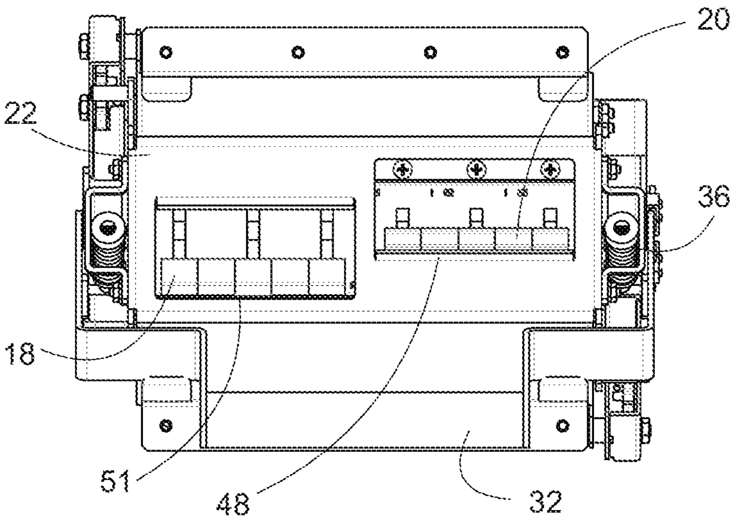
Figure 9C:
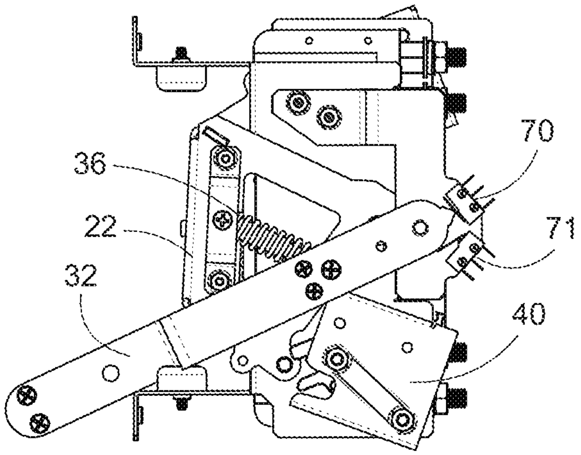

In FIGS. 9*a*, 9*b* and 9*c*, the latch 40 has been released and the trap 22 is travelling upwards under the force of the springs 36. Window edge 48 of trap 22 will first enter into contact with handles 20 of the inverter breaker 14 and move it upward until the inverter breaker contacts are CLOSED/ON. Shortly thereafter, as the trap 22 continues to travel, window edge 51 will reach handles 18 of the utility breaker 12 and begin to move it to the OPEN/OFF position. Once the utility breaker travels a short distance the utility breaker's own bi-stable mechanism will move it fully OFF.

Figure 10A:
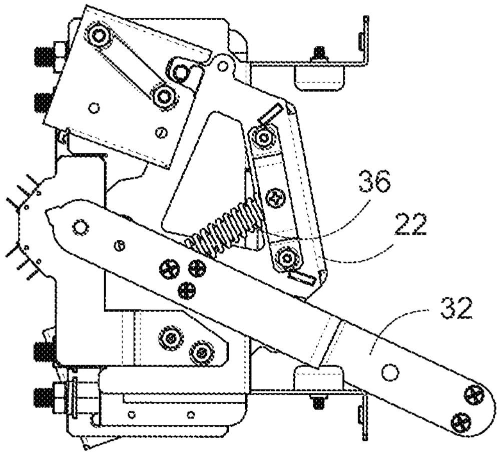
Figure 10B:
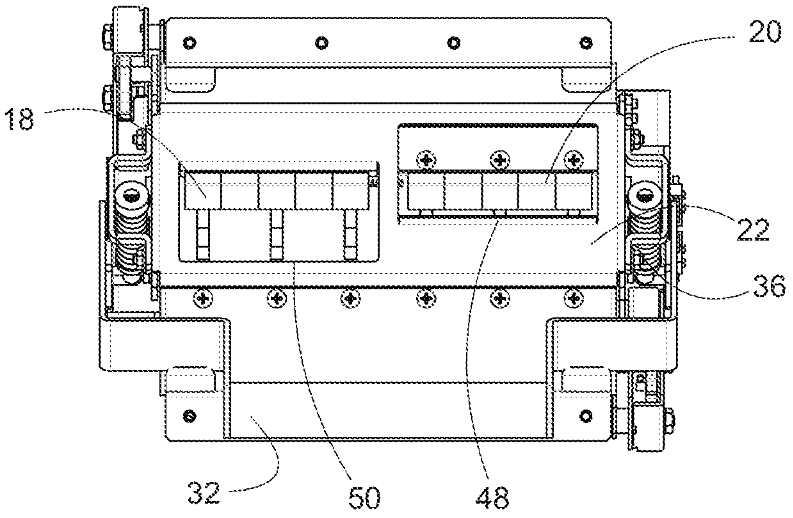
Figure 12:
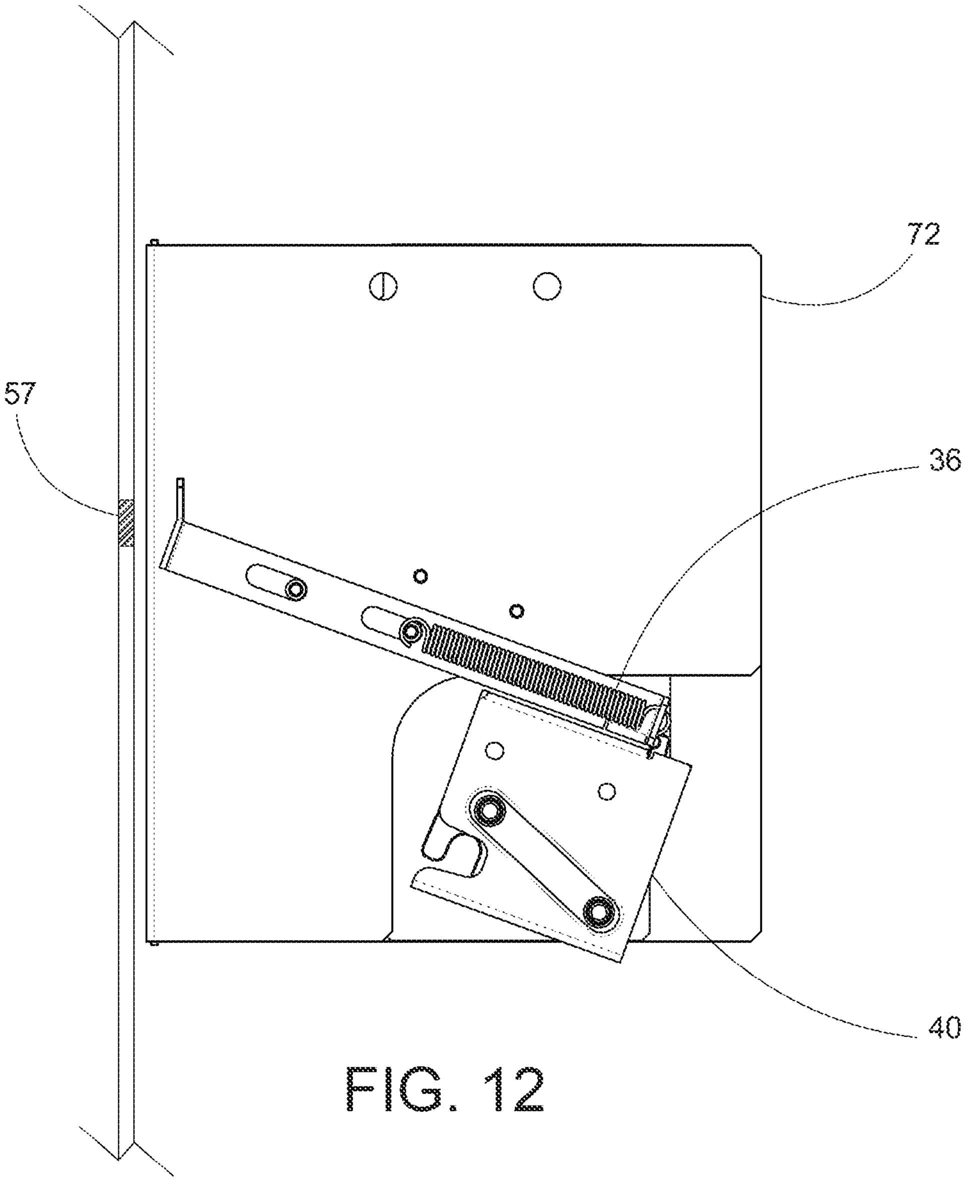
FIG. 12 is a right side elevation of a side mounting plate, latch, spring and spring lever; and, FIG. 13 is a front view of a transfer switch cabinet including a user interface and mode selection switch.

In FIGS. 10*a*, 10*b* and 10*c*, trap 22 having completely moved the inverter breaker 14 to the ON position and the utility breaker 12 to the OFF position, the trap 22 has completed its travel and the switch is resting in the inverter mode. The entire motion of the trap 22 takes 20-50 milliseconds, with approximately 5-20 milliseconds overlap. Those travel time ranges are given for scale only, and they are dependent on the spring selection, mass of the components, and characteristics of the switches and can be adjusted accordingly. Once components are selected the variation in travel time can be made very small.

The switch 10 according to the preferred embodiment is easily mounted to the properly arranged breakers 12, 14. The transfer switch frame 16 is a separate assembly from the breakers 12, 14, with all parts of the switch, including the linkage or trap 22, the handle 32, the compression springs 36, the latch 40 and the controller 50 being mounted to the frame 16 as an assembly which may then be attached as a unit to the set of breakers 12, 14 in a single operation, for example by means of fasteners such as screws 47. This makes replacement of the mechanism relatively easy, and possible to do without disrupting the load connected through the breakers.

A cover 72 prevents inadvertent access to the trap 22 while accommodating the extension of the handle 32 through the cover 72 to the front of the user panel 69. The user panel 69 also includes LEDs 74, 76 to indicate that the inverter mode or utility/bypass mode respectively are in use.

To initiate a transfer the operator moves the handle 32 to the desired position but the latches 40, 41 do not release until certain conditions are met. The mode selector switch 61 determines which conditions are necessary to release the latches and enable completion of the intended transfer. Controller 50 selectively controls the release of the latches.

The transfer switch 10 is provided with limit switches 70, 71 or other position sensors associated with the handle 36 to detect the position of (and transitions of) the handle 32. Limit switches or other position sensors are also included (but not shown) in the latches 40, 41 to detect the position of the latches. The controller 50 monitors the limit switches to determine states and transitions of the handle and the trap so as to identify presently connected and intended transfer sources.

By moving the handle, the operator determines which source is intended to be connected to the load upon transfer. Controller 50 has inputs from each phase of the utility feed 2 and from each phase of the inverter output 27. The controller compares the phases of the utility feed 2 and of the inverter output 27. Controller 50 implements a control protocol. If a transfer is indicated by the handle position in relation to the presently connected source, the controller verifies specific conditions before releasing whichever latch is currently engaged to allow the transfer to complete. The specific conditions checked depend on the operating mode. The conditions for releasing the latches can include predetermined states or characteristics of the incumbent or presently connected source and the destination source. For example one such state may be that the destination source has power. Another such state may be that the destination source has power and that the phases of the presently connected source and of the destination source are synchronized. The predetermined "state" may comprise a combination of states of the sources or indeed of other variables.

"Unsynchronized Mode"

In a user-selectable "unsynchronized" mode, the controller 50 does not control the latches. When the operator moves the handle 32 to its new position, the compression springs 36 become charged, exerting a force on the trap 22, but whichever latch is engaged will only release if there is power on the intended new source. For example if the transfer is intended from the inverter mode (wherein the load 23 is connected to the inverter output 27) to the bypass mode (where the load 23 is connected to the utility feed 2), the latch 41 holding the trap 22 in the UP position will not release unless there is power on the utility source as assessed by the controller 50.

In the unsynchronized mode, the only condition to be satisfied is designed to prevent a dropped load by ensuring that the load will not be disconnected from a valid source and connected to an invalid source. For example, the transfer should not be allowed to proceed if there is no power on the destination source. For the purposes of this patent that condition is termed "Load Protection". In particular, if the load connected to any phase would be dropped, then the controller does not release the latches and the transfer is prevented. This feature is implemented by the controller through dedicated fail-safe circuitry by the monitored phases directly controlling power to the latch release so that even in the event of microprocessor malfunction or remote operator error, the transfer cannot occur.

"Synchronized Mode"

In the user-selectable "synchronized" mode, upon detecting a transition of the handle 32 and of the trap 22 from one source to another, the controller 52 asserts a synchronization request 53 to a microcontroller (not shown) that controls the UPS operation to cause it to adjust the phase of the inverter output. The controller 50 monitors the voltages of the corresponding phases between the sources, and releases the trap 22 when the phase difference is sufficiently small as to be within an acceptable angle. For example, one standard provides that the voltage difference should be less than 15 Vac, corresponding to about 7° for a 120 Vac system. The controller 50 monitors the zero crossings of the corresponding phases from the two sources and prevents the transfer if they are above a set threshold. According to the preferred embodiment, a low threshold of 1° is used. In the preferred embodiment this check is implemented in hardware circuitry so that regardless of the microprocessor state, the synchronization check will function.

If the sources fail to synchronize after a preset time limit, a fault is generated but the controller 50 will continue to wait indefinitely. Due to back-feed protection requirements, the modules can only attempt synchronization for a short time.

Alternatively, in the "synchronized" mode, an operator can open the feed breaker 7 to put the UPS into free running mode. Once the phases eventually synchronize, the controller 50 can release the appropriate latch. In the preferred embodiment, such release only occurs if the additional condition of Load Protection (discussed above) is also met. Preferably, the synchronization request 53 is only asserted once the Load Protection condition is met.

"Automatic Mode"

In the user-selectable "automatic" mode, the switch is set to inverter mode such that the inverter output 27 is connected to the load. The handle 32 is then moved to charge the springs 36. Upon selection of the automatic mode, if the switch is in the inverter mode, the user interface 54 prompts the operator to charge the switch using the handle 32 (if not already done), moving the handle 32 to what would normally trigger the bypass mode, save for the latch 40 retaining the trap 22 in inverter mode. The controller 50 then monitors the inverter for failure of its output and releases the latch 40 and the trap 22 if there is a failure of the inverter output. However, if the utility feed 2 is not present the controller 50 will not allow the transfer to occur. The use of the "automatic" mode enables the automatic switching to the utility feed if the inverter output fails, preferably combined with also ensuring that the Load Protection condition is met. The benefit of this automatic mode is that the load will be restarted immediately whereas otherwise (with traditional bypass switches) a service person must reach the potentially remote site to switch the source. The invention thereby allows a significant increase in availability.

In an embodiment, an additional condition is imposed such that the transfer will occur only if the overall phase supplies to the load would be improved by the transfer having regard to the phases dropped by the inverter output and the state of the phases on the utility feed.

A special circumstance exists when the utility feed 2 fails and the inverter 5 operates until the battery 13 is fully discharged. In this case when the utility feed 2 is restored, it may be preferable to wait for the inverter 5 to come fully online rather than immediately switching the load to the utility feed. For this reason an adjustable timer may be included in the controller logic to hold-off the automatic transfer to utility feed when the bypass system restarts after both sources have been off. In that case if the controller detects that the inverter is now providing proper outputs on all phases, the transfer to the bypass mode will not proceed.

"Controller Mode"

In a user-selectable controller mode, the controller may be configured to release the latch 40 or 41 under any desired conditions, including under remote control.

In this mode controller mode, the handle 32 is moved to charge the springs 36 for eventual actuation of the intended transfer when the appropriate latch 40 or 41 is later released by the controller 50. The controller 50 then controls actuation of the transfer according to a predetermined set of parameters, or in response to a remote control signal received by the controller. According to the preferred embodiment, the additional condition of Load Protection also needs to be met. Preferably, the controller also checks for synchronization of the phases, including asserting a synchronization request to the UPS if necessary.

Although the invention contemplates several modes of operation, the mode selector may allow for the automatic and controller modes to operate concurrently. If both modes are operational, then the transfer will be allowed if conditions of either mode are met. Specifically, the transfer will occur if the load is dropped or if the controller asserts the release command, provided that the Load Protection condition is met.

Finally, there is also a mechanical over-ride option, which is not an operating mode but rather a physically selectable condition of the switch mechanism 10 itself. The operator can manually release the latch 40 or 41 (according to the intended transfer) by inserting a pointed release tool through the appropriate hole 55 or 57 on the operator panel (FIG. 13) to manually release the latch 40 or 41. This would be appropriate for example if there is no AC power source or if the controller 50 has malfunctioned. In the over-ride condition, no Load Protection or other conditions are operative to prevent completion of the transfer.

It will be appreciated that that transfer switch according to the invention is effectively a "smart" switch capable of accommodating and implementing a variety of control modes for bypass switch and switching operation.

The power transfer switch according to the invention can be used to prevent back-feed by using the controller 50 to detect phase differences between the utility and UPS output, which is typically operated a few degrees out of phase with the utility. If the phase difference falls below a predetermined threshold, such as 2 degrees, the controller can trigger a back-feed detection alarm to alert operators, or the system of the invention can automatically transfer the load to the utility if appropriate conditions are met.

The use of controller 50 to receive inputs from the utility feed 2 and the inverter output 27 feed allows the controller to also operate as a meter, recording, storing or remotely reporting meter data through a communication channel.

The use of limit switches 70, 71 or other position sensors associated with the handle or the trap allows the controller to monitor the speed at which the handle and trap transition between states. That in turn allows a predictive determination of the condition of the switch and of the possible failure or need for maintenance of the switch. A reduction in the speed of the transitions typically signals a potential deterioration of the system, for example due to rust or other obstructions.

While the preferred embodiment has been described, various other embodiments are possible. The switches can be switches or breakers, be they commercially available or customized and in this description it is understood that references to breakers may be substituted by references to switches.

The actuator can be a manually operated handle or it can be an electric or hydraulic drive, ideally with the feature that once it passes the bi-stable point it freely moves to the limit of its travel. The trap can be a single part with windows to operate the breakers, or it may have resilient components which soften the force of impact on the switch handles or provide reduced force overtravel. This increases the margin of operation, however it has the potential of damaging the breaker if the force is too great (or too stiff). The spring can be any type of spring, or it could be a pneumatic piston with force and speed control as required.

The compression springs of the preferred embodiment are bias members and other forms of generating a biasing force may be contemplated.

In order to balance the effect of gravity, a counterbalance weight can be added to the trap or a counterforce spring can be added between the trap and the frame. Particularly for larger switches which require higher operation forces, or for switches with tight mechanical constraints, these improve the operation such that the up and down motions have closer to the same time period.

In one contemplated embodiment of the invention, the pivoting latches 40 and 41 can be replaced by a solenoid-actuated locking pin.

It will be appreciated that actuation of the handle used in the switch may be manually by an operator or it may be actuated by a motor or other mechanical intervention.

While the preferred embodiment has been described in relation to switching between an AC utility and a UPS, the switch according to the invention can be used in switching between DC sources, with appropriate modifications. For example, no "synchronized" or "unsynchronized" modes would be involved.

However, an automatic mode can still trigger an automatic transfer in the case of the failure of a source, and meeting possible additional conditions as determined by the controller monitoring.

In the foregoing description, exemplary modes for carrying out the invention in terms of examples have been described. However, the scope of the claims should not be limited by those examples, but should be given the broadest interpretation consistent with the description as a whole. The specification and drawings are, accordingly, to be regarded in an illustrative rather than a restrictive sense.

The invention claimed is:

1. A power transfer switch for transferring a load from a connected source to a destination source, comprising:
- an abutment member mounted to pivot in a direction of travel between two positions;
- said abutment member configured such that during a pivoting motion in said direction, said abutment member
  - acts on and applies force first to a first switch beginning at a first point in the travel of the abutment member, and
  - later acts on and applies force to a second switch beginning at a second point in the travel of the abutment member such that said travel between said two positions acts to toggle said first and second switches non-simultaneously; and
- a latch for selectively engaging said abutment member to restrain said abutment member from moving.

2. The power transfer switch of claim 1 further comprising a bias member selectively applying force on said abutment member in said direction.

3. The power transfer switch of claim 2 wherein said bias member is a compression spring.

4. The power transfer switch of claim 2 wherein said bias member is a compression spring secured between a frame of said power transfer switch and said abutment member in a bi-stable over-center toggle configuration.

5. The power transfer switch of claim 2 wherein said bias member is a compression spring secured between a frame of said power transfer switch and said abutment member in a bi-stable over-center toggle configuration, and wherein said abutment member and said compression spring are configured such that when said abutment member travels past a fulcrum point the abutment member is driven by a bias force exerted by said compression spring to complete the travel of said abutment member.

6. The power transfer switch of claim 5 wherein said power transfer switch further comprises a pivoting handle for charging said compression spring.

7. The power transfer switch of claim 2, wherein
- said abutment member comprises a plurality of abutment surfaces, a first one of said abutment surfaces being spaced from a second one of said abutment surfaces along said direction, said first and second abutment surfaces during said travel urging said first and second switches respectively to non-simultaneously toggle from a first toggle position to a second toggle position,
- engagement of said latch on said abutment member prevents said bias member from causing said abutment member to travel between said two positions, and release of said latch from said abutment member allows said bias member to cause said abutment member to travel between said two positions, and
- said bias member is a compression spring.

8. The power transfer switch of claim 1 further comprising a bias member selectively applying force on said abutment member in said direction, and wherein engagement of said latch on said abutment member prevents said bias member from causing said abutment member to travel between said two positions, and release of said latch from said abutment member allows said bias member to cause said abutment member to travel between said two positions.

9. The power transfer switch of claim 1 wherein said abutment member comprises a plurality of abutment surfaces, a first one of said abutment surfaces being spaced from a second one of said abutment surfaces along said direction, said first and second abutment surfaces as said first and second switches respectively are urged to non-simultaneously toggle from a first toggle position to a second toggle position.

10. The power transfer switch of claim 9 wherein a third one of said abutment surfaces is spaced from a fourth one of said abutment surfaces along said direction of travel, said third and fourth abutment surfaces during travel in an opposite direction to a direction urging said first and second switches respectively to toggle non-simultaneously from said second toggle position to said first toggle position.

11. The power transfer switch of claim 10 further comprising:

a first bias force member selectively applying force on said abutment member in said direction and a second bias force member selectively applying force on said abutment member in an opposite direction to said direction.

12. The power transfer switch of claim 8 or claim 10 further comprising a controller configured to implement a control protocol for selectively engaging or releasing said latch.

13. The power transfer switch of claim 9 wherein said abutment member comprises two windows configured to allow breaker handles to protrude through said windows, said first abutment surface being an edge of a first one of said windows, said second abutment surface being an edge of a second one of said windows.

14. The power transfer switch of claim 1 wherein said connected source is one of a group comprising utility power, inverter output, output of an uninterruptible power supply system, said power transfer switch further comprising a controller for selectively releasing said latch.

15. The power transfer switch of claim 14 wherein said controller is configured to receive instructions from a communication network.

16. The power transfer switch of claim 14 wherein said controller has inputs from said connected source and from said destination source.

17. A power transfer switch for transferring a load between a utility and an uninterruptible power supply, comprising:

a displaceable linkage for abutting a first breaker that selectively connects or disconnects said load from said utility and a second breaker that selectively connects or disconnects said load from said uninterruptible power supply, displacement of said linkage causing abutment of said linkage against said first and second breakers to toggle said first and second breakers between a connected state and a disconnected state;

a compression spring mounted in a bi-stable over center configuration between a handle and said linkage so as to exert a driving force on said linkage when said linkage is displaced past a fulcrum point;

a handle for compressing said compression spring;

a releasable latch configured to selectively restrain said linkage from displacement; and, a controller for controlling the release of said latch.

18. The power transfer switch of claim 17 wherein toggling of said first and second breakers in a same direction respectively opens and closes said first and second breakers.

19. The power transfer switch of claim 17 wherein said controller is configured to release said latch only upon the detection of a predetermined state of said utility and said uninterruptible power supply.

20. The power transfer switch of claim 19 wherein said controller is configured to record power usage.

21. The power transfer switch of claim 19 wherein said controller is configured to produce an alarm signal if a phase difference between said utility and an output of said uninterruptible power supply is below a predetermined threshold.

22. The power transfer switch of claim 17 further comprising position sensors for detecting a position of said linkage and said controller is configured to record a speed of switching as a function of inputs from said position sensors.

23. The power transfer switch of claim 17 wherein said linkage, said compression spring, said handle, said latch and said controller are mounted within a frame of said power transfer switch to form an assembly and said assembly is connectable as a unit by fasteners to said first and second breakers.

24. A power transfer switch for transferring a load from a connected source to a destination source, comprising:

an abutment member mounted to pivot in a direction of travel between two positions;

said abutment member configured such that during a pivoting motion in said direction, said abutment member acts on and applies force first to a first switch beginning at a first point in the travel of the abutment member, and later to a second switch beginning at a second point in the travel of the abutment 'member such that said travel between said two positions acts to toggle said first and second switches non-simultaneously;

a latch for selectively engaging said abutment member to restrain said abutment member from moving; and a bias member selectively applying force on said abutment member in said direction, and wherein engagement of said latch on said abutment member prevents said bias member from causing said abutment member to travel between said two positions, and release of said latch from said abutment member allows said bias member to cause said abutment member to travel between said two positions.

25. The power transfer switch of claim 24 wherein said bias member is a compression spring.

26. The power transfer switch of claim 24 further comprising a controller configured to implement a control protocol for selectively engaging or releasing said latch.

27. A power transfer switch for transferring a load from a connected source to a destination source, comprising:

an abutment member mounted to pivot in a direction of travel between two positions;

said abutment member configured such that during a pivoting motion in said direction, said abutment member acts on and applies force first to a first switch beginning at a first point in the travel of the abutment member, and later to a second switch beginning at a second point in the travel of the abutment member such that said travel between said two positions acts to toggle said first and second switches non-simultaneously;

wherein said abutment member comprises a plurality of abutment surfaces, a first one of said abutment surfaces being spaced from a second one of said abutment surfaces along said direction, said first and second abutment surfaces during said travel urging said first and second switches respectively to non-simultaneously toggle from a first toggle position to a second toggle position.

28. The power transfer switch of claim 27 wherein said bias member is a compression spring.

29. The power transfer switch of claim 27 wherein a third one of said abutment surfaces is spaced from a fourth one of said abutment surfaces along said direction of travel, said third and fourth abutment surfaces during travel in an opposite direction to said direction urging said first and second switches respectively to toggle non-simultaneously from said second toggle position to said first toggle position.

30. The power transfer switch of claim 29 further comprising:

a first bias force member selectively applying force on said abutment member in said direction and a second bias force member selectively applying force on said abutment member in an opposite direction to said direction; and, a latch for selectively engaging said abutment member to restrain said abutment member from moving.

31. The power transfer switch of claim 27 further comprising a controller configured to implement a control protocol for selectively engaging or releasing said latch.

32. The power transfer switch of claim 27 wherein said abutment member comprises two windows configured to allow breaker handles to protrude through said windows, said first abutment surface being an edge of a first one of said windows, said second abutment surface being an edge of a second one of said windows.

* * * * *